United States Patent [19]

Cook et al.

[11] 4,400,990
[45] Aug. 30, 1983

[54] STEERING COLUMN ASSEMBLY

[75] Inventors: Ronald A. Cook, Hockley; Derek W. Strutt, Chelmsford, both of England

[73] Assignee: Ford Motor Company, Dearborn, Mich.

[21] Appl. No.: 226,276

[22] Filed: Jan. 19, 1981

[30] Foreign Application Priority Data

Feb. 29, 1980 [GB] United Kingdom ................. 8007027

[51] Int. Cl.³ .............................................. B62D 1/18
[52] U.S. Cl. ..................................... 74/492; 280/779; 308/1 A
[58] Field of Search .................. 74/492, 493; 280/777, 280/779; 308/1 A

[56] References Cited

U.S. PATENT DOCUMENTS

| | | | |
|---|---|---|---|
| 4,185,880 | 1/1980 | Shiomi et al. | 74/492 |
| 4,277,984 | 7/1981 | Numazawa et al. | 74/492 |
| 4,297,911 | 11/1981 | Grahn | 74/492 |
| 4,325,268 | 4/1982 | Benteler et al. | 74/492 |

Primary Examiner—Allan D. Herrmann
Attorney, Agent, or Firm—Peter D. McDermott; Roger L. May

[57] ABSTRACT

A steering column assembly for a motor vehicle comprises three shaft parts (1, 7, 8) connected by universal joints (6, 9) and arranged along non-coincident axes. A jacket (13) surrounding the upper shaft part and fixed to the vehicle body includes a collapsable energy-absorbing element (16). The upper shaft part (1) is rotatably mounted in the jacket (13) by an upper thrust bearing (18) and a lower bearing (19). The lower bearing (19) includes a bearing member (20) which disengages from the jacket (13) during downward movement of the upper shaft part (1) under impact loads so that the shaft part (1) can move radially relative to the jacket.

14 Claims, 3 Drawing Figures

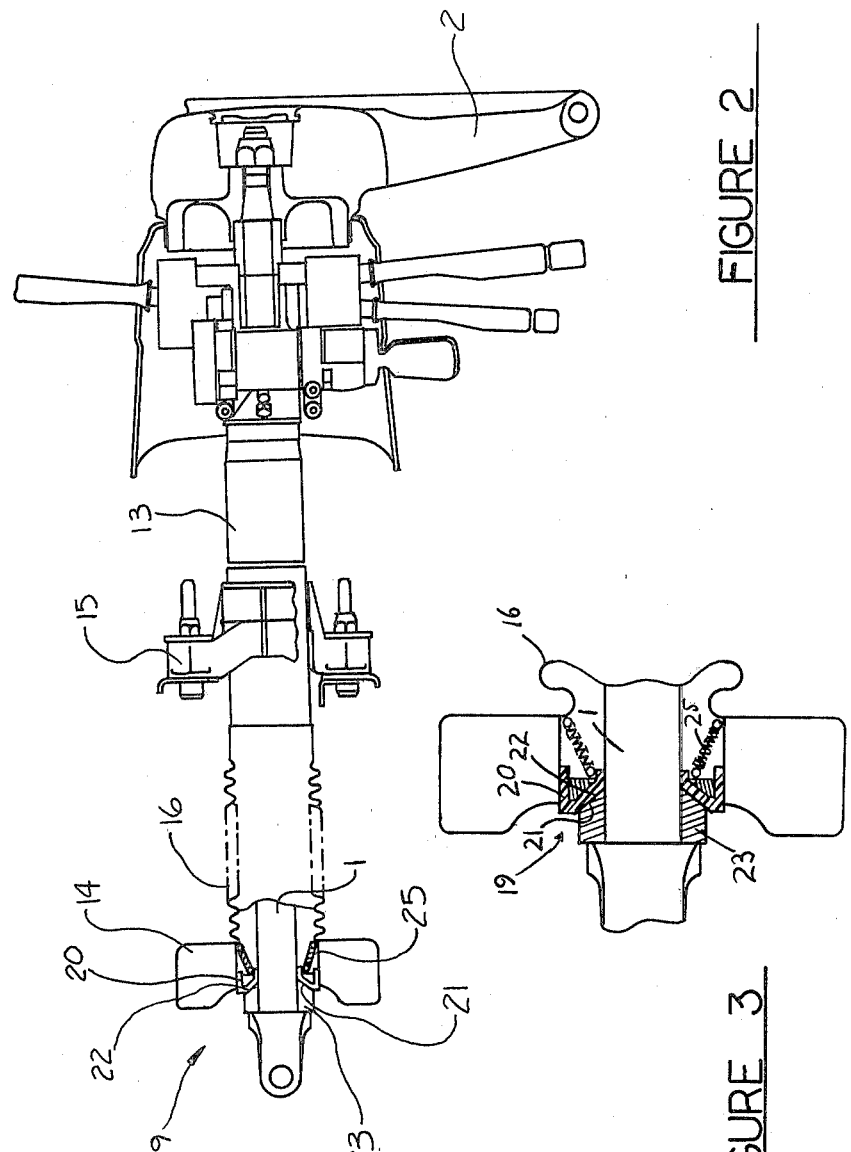

STEERING COLUMN ASSEMBLY

BACKGROUND OF THE INVENTION

1. Field of the Invention

This invention relates to steering column assemblies for motor vehicles.

2. Background Information

Conventional steering columns for motor vehicles comprise a steering shaft with an axially extending upper shaft part adapted at its upper end for connection to a steering wheel, and adapted at its lower end for connection to a second shaft part, a jacket surrounding the upper shaft part along at least part of its length, and a mounting bracket secured to the jacket for connecting the jacket to the body of a vehicle, the jacket including an energy absorbing element which undergoes deformation when an impact load is applied to the upper shaft part sufficient to move the column part relative to the mounting bracket. For exaple, the jacket may include a circumferentially corrugated section which either collapses or expands in the axial direction under impact conditions.

A bearing is normally provided in the lower part of the jacket to allow the shaft to rotate in the jacket and to prevent the shaft from moving radially relative to the jacket. When an impact load is applied to the upper end of the upper shaft part, the shaft part moves axially downwardly and causes the energy absorbing element to elongate or collapse in the axial direction. If the upper shaft part is connected to a second shaft part coaxial with the upper shaft part by means of a telescopic connection, the upper shaft part will retain its radial orientation with respect to the jacket, and will not interfere with the axial deformation of the energy absorbing element.

In some cases however, it is desirable to connect the upper shaft part to a lower shaft part by means of an intermediate shaft part connected to the other parts by flexible joints, e.g., a universal joint, so that the upper and lower shaft parts can be disposed along different axis. In such an arrangement, if the lower shaft part were to remain stationary when an impact load was applied to the upper shaft part, the intermediate shaft part would tend to move the lower end of the upper shaft part radially; this radial movement would be resisted by the bearing, and the energy absorbing element of the jacket would be unable to deform until sufficient force had been applied to the column to move the lower parts of the shaft radially.

SUMMARY OF THE INVENTION

According to the present invention there is provided a steering column assembly comprising an axially-extending upper shaft part adapted at its upper end for connection to a steering wheel and adapted at its lower end for connection to a second shaft part; a jacket surrounding the upper shaft part along at least part of its length; a mounting bracket secured to the jacket for connecting the jacket to the body of a vehicle and a bearing in the lower part of the jacket for allowing the upper shaft part to rotate in the jacket and for preventing the upper shaft part from moving radially relative to the jacket, the jacket including an energy-absorbing element which undergoes deformation when an impact load is applied to the shaft part sufficient to move the shaft downwardly relative to the mounting bracket, characterised in that the bearing is disengagable from the jacket during the downward movement of the shaft part to allow the shaft part to move radially relative to the jacket.

Since the bearing disengages from the jacket during downward movement of the upper shaft part, radial movement of the shaft can be accommodated by the space between the shaft part and the jacket, so that the energy-absorbing element is capable of deforming even when the lower end of the second shaft part remains fixed.

The bearing may be of any suitable construction but preferably comprises an annular bearing member mounted on the upper shaft part and received in the lower end of the jacket, and retained therein by an abutment member mounted on the upper shaft part.

Preferably the bearng member is biased into engagement with the abutment, for example by means of a spring acting between the jacket and the bearing member, thus ensuring that the bearing member is cleared from the lower end of the jacket when the upper shaft part is moved downwardly.

By providing complementary coaxial frusto-conical engaging surfaces on the abutment member and the bearing member, the force exerted by the spring serves to direct the upper shaft part in to a central position in the jacket during normal operation of the colum.

BRIEF DESCRIPTION OF THE DRAWINGS

A preferred embodiment of the invention will now be described, by way of example only, with reference to the accompanying drawings, in which:

FIG. 2 is a plan view of part of the assembly of FIG. 1.

FIG. 3 is a fragmentary enlarged view of the lower bearing shown in FIG. 2.

DETAILED DESCRIPTION OF THE PREFERRED EMBODIMENT

Figure 1:
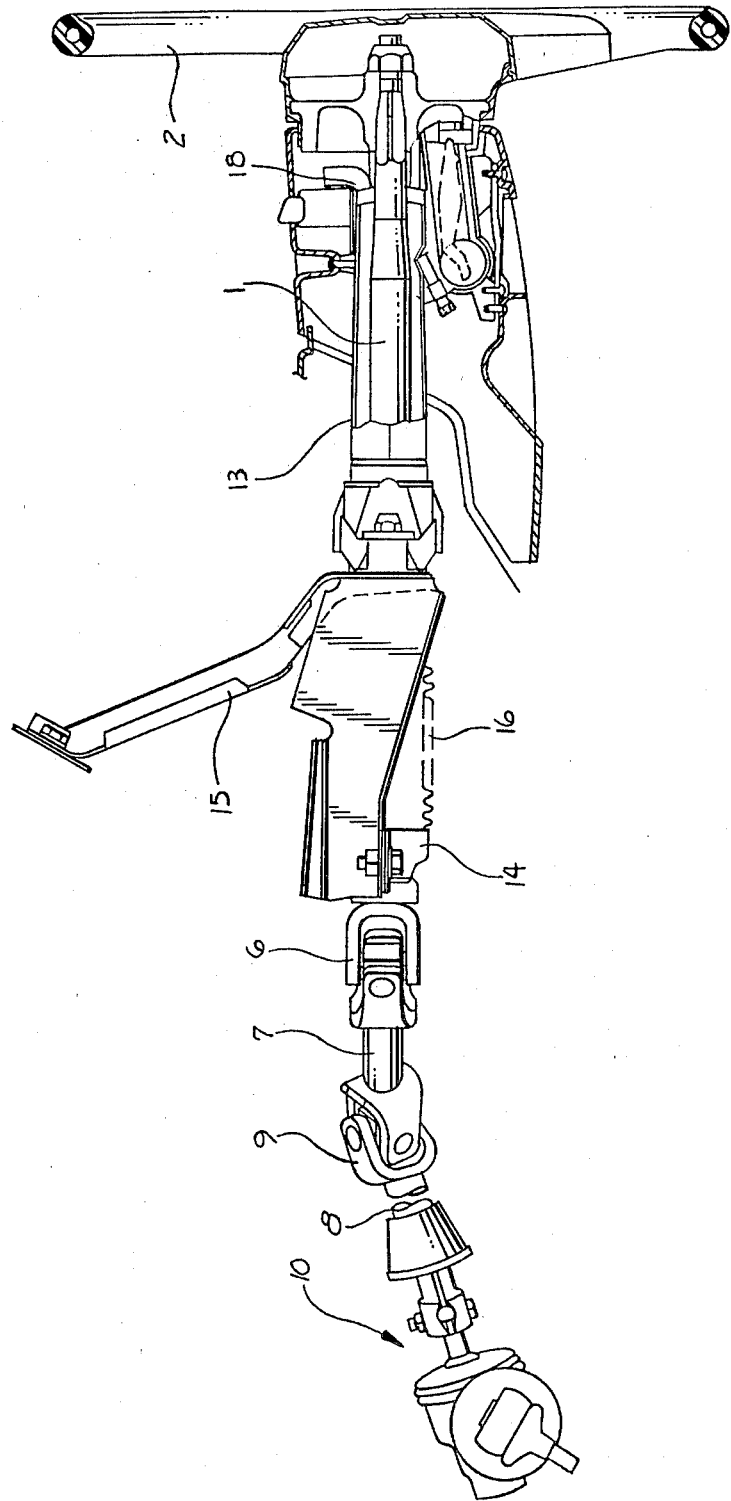
FIG. 1 is a side view, of part of a steering column assembly in accordance with the invention, partially in cross-section.

Referring to the drawings, the steering column assembly comprises three shaft parts. The first shaft part 1 is connected at its upper end to a steering wheel 2. The lower end of the first shaft part is coupled by a universal joint 6 to a second shaft part 7 which is also coupled to a third shaft part by means of a further universal joint 9. The third shaft part 8 is drivingly connected to a steering gear assembly 10. The three shaft parts 1, 7, 8 can all be arranged along different axes, thus allowing the column assembly to be installed in a relatively short space in a vehicle.

Referring to FIG. 2, a tubular jacket 13 surrounds the first shaft part 1. The jacket 13 carries a mounting bracket 14 by means of which the jacket 13 can be connected to a supporting structure 15 (see FIG. 1) attached to the vehicle body. An energy absorbing element 16 is incorporated in the jacket. This element comprises a tubular section of the jacket 13 having circumferential corrugations which are shaped so as to allow the element 16 to collapse in the axial direction when a predetermined axial compressive force is applied to the element 16.

The first shaft part 1 is rotatably mounted in the jacket 13 by means of upper and lower bearing assemblies 18, 19 (FIG. 1). The upper bearing 18 comprises a thrust bearing assembly which transmits any downward axial loads on the first shaft part 1 to the jacket 13.

The lower bearing comprises an annular bearing member 20 of plastics material mounted on the shaft part 1 and received as a sliding fit in the lower end of the jacket 13. The bearing member 20 allows the shaft part 1 to rotate relative to the jacket 13 and prevents the shaft part 1 from moving radially relative to the jacket. The lower surface of the bearing member 20 defines a frusto-conical engagement surface 21 which abuts a complementary coaxial engagement surface 22 of an abutment 23 mounted on the lower end of the first shaft part 1 adjacent the universal joint 6.

A tapered coil spring 25 mounted in the jacket 13 adjacent the element 16 acts on the upper side of the bearing member 20 to bias the bearing member into engagement with the abutment 23.

In use, the force exerted by the coil spring 25 is transmitted to the first shaft part 1 so that the column part 1 is retained positively in the jacket 13. The frusto-conical surfaces 21, 22 also ensure that the shaft part 1 is properly centred in the jacket 13.

When an impact load is applied to the steering wheel 2, as a result of a collision, the force of the impact is transmitted to the jacket 13 through the upper bearing 18, thus applying a compressive force to the element 16. If the force is sufficiently great, it will cause the element 16 to collapse axially, allowing the upper shaft part 1 to move downwardly and yield to the impact, thereby reducing the risk of injury to the driver.

Since the second shaft part 17 is arranged along a different axis from the first shaft part 1 and the lower end of the second shaft part is fixed, it will tend to deflect the lower end of the first shaft part 1 radially with respect to the axis of the first shaft part. If the bearing member 23 were to prevent such radial movement, the impact force on the wheel 2 would be transmitted to the second and third shaft parts 7, 8, which would in turn be moved radially before the element 16 could deform. Since movement of these two shaft parts would involve considerable effort, the reaction force exerted by the wheel 2 could be substantial.

In the present construction however, downward movement of the first shaft part 1 pushes the abutment 23 out of engagement with the annular bearing member 20, which is itself disengaged from the jacket 13 by means of the coil spring 25. As a result, the lower end of the first shaft part 1 becomes free to move radially relative to the jacket 13 so that the first shaft part 1 is not transmitted to the jacket 13. The element 16 can collapse in the axial direction. It will be appreciated that the sizes of the bearing 20, the jacket 13 and the first shaft part 1 can be so selected in relation to the geometry of the steering column that the element 16 can collapse to its fullest extent before the shaft part 1 engages the side of the jacket 13.

Variations and modifications of the present invention are possible without departing from the scope and spirit as defined by the appended claims.

We claim:

1. A steering column assembly comprising an axially-extending upper shaft part adapted at its upper end for connection to a steering wheel and adapted at its lower end for connection to a second shaft part; a jacket surrounding the upper shaft part along at least part of its length; a mounting bracket secured to the jacket for connecting the jacket to the body of a vehicle and a bearing in the lower part of the jacket for allowing the upper shaft part to rotate in the jacket and for preventing the upper shaft part from moving radially relative to the jacket, the jacket including an energy-absorbing element which undergoes axial deformation when an impact load is applied to the upper shaft part sufficient to move the upper shaft part downwardly relative to the mounting bracket, characterized in that the bearing is disengagable from the jacket during the downward movement of the upper shaft part to allow the upper shaft part to move radially relative to the jacket.

2. A steering column assembly according to claim 1 wherein the bearing comprises an annular bearing member mounted on the upper shaft part and received in the end of the jacket nearer to the said lower end of the upper shaft part, and the upper shaft part carries an abutment member towards its said lower end, the abutment being effective to retain the bearing member in the end of the jacket.

3. A steering column assembly comprising an axially-extending upper shaft part adapted at its upper end for connection to a steering wheel and adapted at its lower end for connection to a second shaft part; a jacket surrounding the upper shaft part along at least part of its length; a mounting bracket secured to the jacket for connecting the jacket to the body of a vehicle and a bearing in the lower part of the jacket for allowing the upper shaft part to rotate in the jacket and for preventing the upper shaft part from moving radially relative to the jacket, the jacket including an energy-absorbing element which undergoes axial deformation when an impact load is applied to the upper shaft part sufficient to move the upper shaft part downwardly relative to the mounting bracket, characterized in that the bearing is disengagable from the jacket during the downward movement of the shaft part to allow the upper shaft part to move radially relative to the jacket; and the bearing comprises an annular bearing member mounted on the upper shaft part and received in the end of the jacket nearer to the said lower end of the upper shaft part, and the upper shaft part carrying an abutment member towards its said lower end, the abutment being effective to retain the bearing member in the end of the jacket; the bearing member and the abutment having complementary coaxial frusto-conical engaging surfaces.

4. A steering column assembly according to claim 2 or claim 3 wherein the bearing member is biased into engagement with the abutment.

5. A steering column assembly according to claim 4 wherein the bearing member is biased by means of a spring acting between the jacket and the bearing member.

6. A steering column assembly according to any one of claims 1, 2 or 3 wherein the deformable member is arranged to collapse under impact loads.

7. A steering column assembly according to claim 4 wherein the deformable member is arranged to collapse under impact loads.

8. A steering column assembly according to claim 5 wherein the deformable member is arranged to collapse under impact loads.

9. A steering column assembly according to any one of claims 1, 2 or 3 further comprising a second column part connected to the first-mentioned column part by means of a flexible coupling.

10. A steering column assembly according to claim 4 further comprising a second column part connected to the first-mentioned column part by means of a flexible coupling.

11. A steering column assembly according to claim 5 further comprising a second column part connected to the first-mentioned column part by means of a flexible coupling.

12. A steering column assembly according to claim 6 further comprising a second column part connected to the first-mentioned column part by means of a flexible coupling.

13. A steering column assembly according to claim 7 further comprising a second column part connected to the first-mentioned column part by means of a flexible coupling.

14. A steering column assembly according to claim 8 further comprising a second column part connected to the first-mentioned column part by means of a flexible coupling.

* * * * *